Feb. 16, 1954   C. GERST   2,669,131
DRIVE ARRANGEMENT FOR TRUCK MIXERS
Filed March 6, 1950   4 Sheets-Sheet 1

INVENTOR.
CHRIS GERST
BY
Gustav A. Woeff
ATT.

Feb. 16, 1954   C. GERST   2,669,131
DRIVE ARRANGEMENT FOR TRUCK MIXERS
Filed March 6, 1950   4 Sheets-Sheet 2

INVENTOR.
CHRIS GERST
BY
Gustav A. Wolf
ATT.

Feb. 16, 1954    C. GERST    2,669,131
DRIVE ARRANGEMENT FOR TRUCK MIXERS
Filed March 6, 1950    4 Sheets-Sheet 3

INVENTOR.
CHRIS GERST
BY
ATT.

Patented Feb. 16, 1954

2,669,131

UNITED STATES PATENT OFFICE 2,669,131

DRIVE ARRANGEMENT FOR TRUCK MIXERS

Chris Gerst, Detroit, Mich., assignor, by mesne assignments, to Le Roi Company, Milwaukee, Wis., a corporation of Wisconsin Application March 6, 1950, Serial No. 147,867

6 Claims. (Cl. 74—730)

This invention relates to vehicles supporting individual rotary devices driven by individual power units and is particularly useful when incorporated in the drive arrangement for the mixing drums of concrete mixers, such as truck mixers. In these concrete mixers the mixing drum is customarily driven by an individual power transmission system embodying a primary transmission directly coupled with an engine and a secondary transmission coupled with the primary transmission and the mixing drum, by means of a large gear attached to the mixing drum and meshing a pinion mounted on the output shaft of the secondary transmission. Such arrangements necessitate use of engines capable of producing sufficient torque to effect starting of the rotation of the mixing drum and reversing of its rotation, though continuous rotation of the mixing drum could be effected with much smaller engines.

The primary object of the invention is the provision of a torque converter type transmission system embodying a torque converter arranged to be directly coupled with the engine, the torque converter permitting starting, driving and reversing of the mixing drum by an engine producing sufficient torque to effect continuous rotation of the mixing drum but insufficient torque to effect starting or reversing of the rotation of such mixing drum.

Another object of the invention is the provision of a torque converter transmission embodying a torque converter arranged at the input side of the transmission to permit positioning of the torque converter adjacent to the fly wheel of an engine for direct drive connection of the converter pump with such fly wheel.

Another object of the invention is the combination of a torque converter transmission with a concrete mixer drive arrangement in which a transmission is universally coupled with the rotatably supported mixing drum of the mixer and yieldingly coupled with the torque converter transmission to permit starting, driving and reversing of the mixing drum by an engine of sufficient power to continuously rotate the mixing drum but of insufficient power to effect starting or reversing of the mixing drum.

Still another object of the invention is the combination of torque converter transmissions with concrete mixer arrangements on truck mixers for decreasing size and weight of the power means driving the mixing drums, permitting increase of the pay loads and reducing the construction costs as well as the operating expense.

A further object of the invention is the provision of a multi-speed torque converter transmission for concrete mixers of the type referred to above in which the transmission includes reversing clutches for effecting selective forward or reverse rotation of the mixing drum of these mixers, the clutches being arranged outside of the housing of the transmission to facilitate and simplify adjustment, service and repair of such clutches.

Still further objects and novel features of construction, combination and relation of parts by which the objects in view have been attained, will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and broad scope of the invention.

Figure 1:
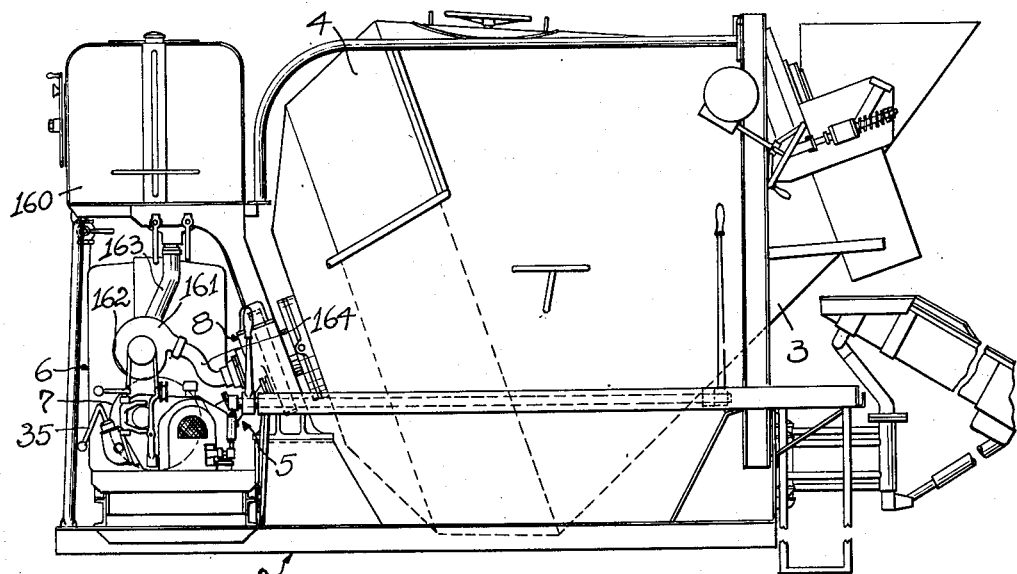
Fig. 1 is a side view of a concrete mixer arrangement for a truck mixer showing the general drive arrangement and mounting of its mixing drum.
Figure 2:
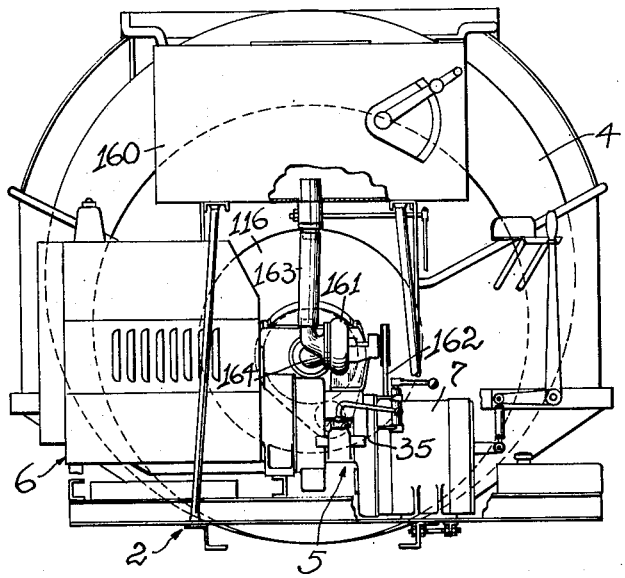
Fig. 2 is an end view of the structure shown in Fig. 1.

Referring now more particularly to the exemplified form of the torque converter drive arrangement shown in the drawings, reference numeral 2 denotes the main frame of a concrete mixer, which frame freely-rotatably supports the rear end 3 of mixing drum 4 driven and partly supported by a drive arrangement 5 embodying a motor unit 6, a primary torque converter transmission 7 and a secondary transmission 8, which latter is coupled with the mixing drum 4 and supports the front end thereof in a manner later to be described and claimed in detail in my copending application Serial No. 252,825, filed on the 24th day of October, 1951.

Figure 3:
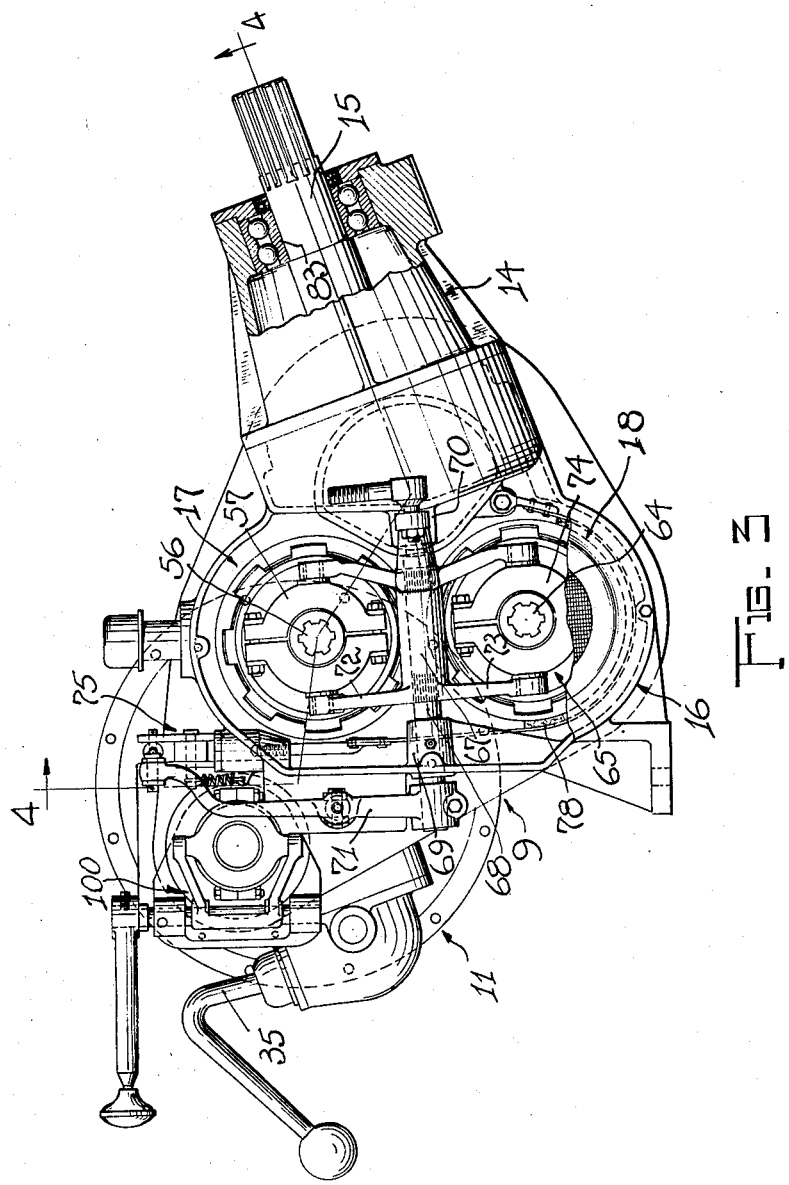
Fig. 3 is a front view of the torque converter transmission used to drive the mixing drum of the structure shown in Figs. 1 and 2.
Figure 4:
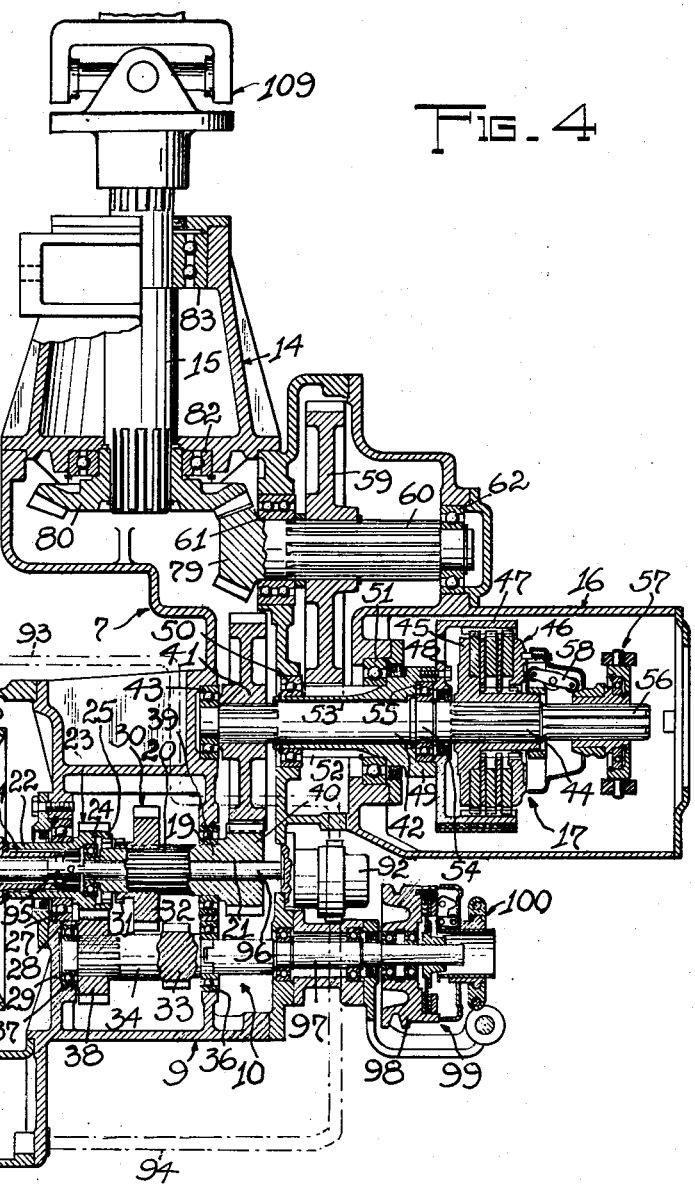
Fig. 4 is a sectional view on line 4—4 of Fig. 3.

The primary torque converter transmission 7 embodies a main housing 9 mounting the gear mechanism of a two-speed forward and reverse drive arrangement 10, a torque converter housing portion 11 mounting a torque converter 12, an output shaft supporting housing portion 14 mounting an output shaft 15, and a clutch housing portion 16 mounting two individual clutch mechanisms 17 and 18 (see Fig. 3) to be later described.

Main housing 9 rotatably supports in a ball bearing 19 a shaft 20 which includes an axial bore 21 and has its other end rotatably mounted in a tubular drive shaft 22 axially aligned with shaft 20 and formed with a double gear 23 including a spur gear 24 and a ring gear 25. The tubular shaft 22 is internally splined for coupling same with the torque converter 12, as will be later described, and is rotatably mounted in a ball bearing 27 arranged in a bore 28 in end wall 29 of main housing 9.

Shaft 20 is splined and supports slidably and non-rotatably a shiftable double gear 30 which includes a small spur gear 31 adapted to engage with the ring gear 25 of tubular drive shaft 22 and a large spur gear 32 adapted to engage a small gear 33 on a countershaft 34 when double gear 30 is shifted on shaft 20 in one or the other direction by gear shifting lever 35 as commonly practiced and not described in detail. The countershaft 34 which is pivotally mounted in ball bearings 36 and 37 mounts at its inner end portion a spur gear 38 continuously meshing spur gear 24 on tubular shaft 22 so that this latter shaft and countershaft 34 are rotated in opposite directions with respect to each other.

Shaft 20, at its end portion 39 adjacent to ball bearing 19, includes a drive pinion 40 meshing a large gear 41 on an outwardly extended shaft 42 which has its inner end rotatably mounted in a ball bearing 43. Shaft 42 extends through main housing 9 into the clutch housing portion 16 and mounts on its splined portion 44 the backing plate structure 45 of a clutch 46 having a cup-shaped housing 47 secured by bolts 48 to a tubular shaft 49 rotatably mounted in ball bearings 50 and 51. This tubular shaft which is formed with gear teeth 52 has axially extended through its axial bore 53 the shaft 42 and rotatably supports the middle portion 54 of such shaft by a ball bearing 55. The shaft 42 shiftably and non-rotatably supports on its splined end portion 56 an operating collar member 57 cooperating with dual lever members 58 in effecting clutching and releasing actions of clutch 46. The tubular shaft 49 has its gear teeth 52 in mesh with a large gear 59 mounted on a splined countershaft 60 which is rotatably mounted in ball bearings 61, 62.

Figure 5:
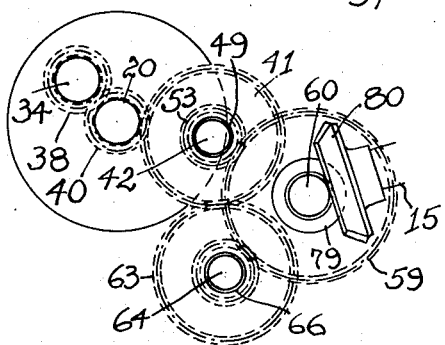
Fig. 5 is a diagrammatical showing of the gear layout of the torque converter transmission.
Figure 6:
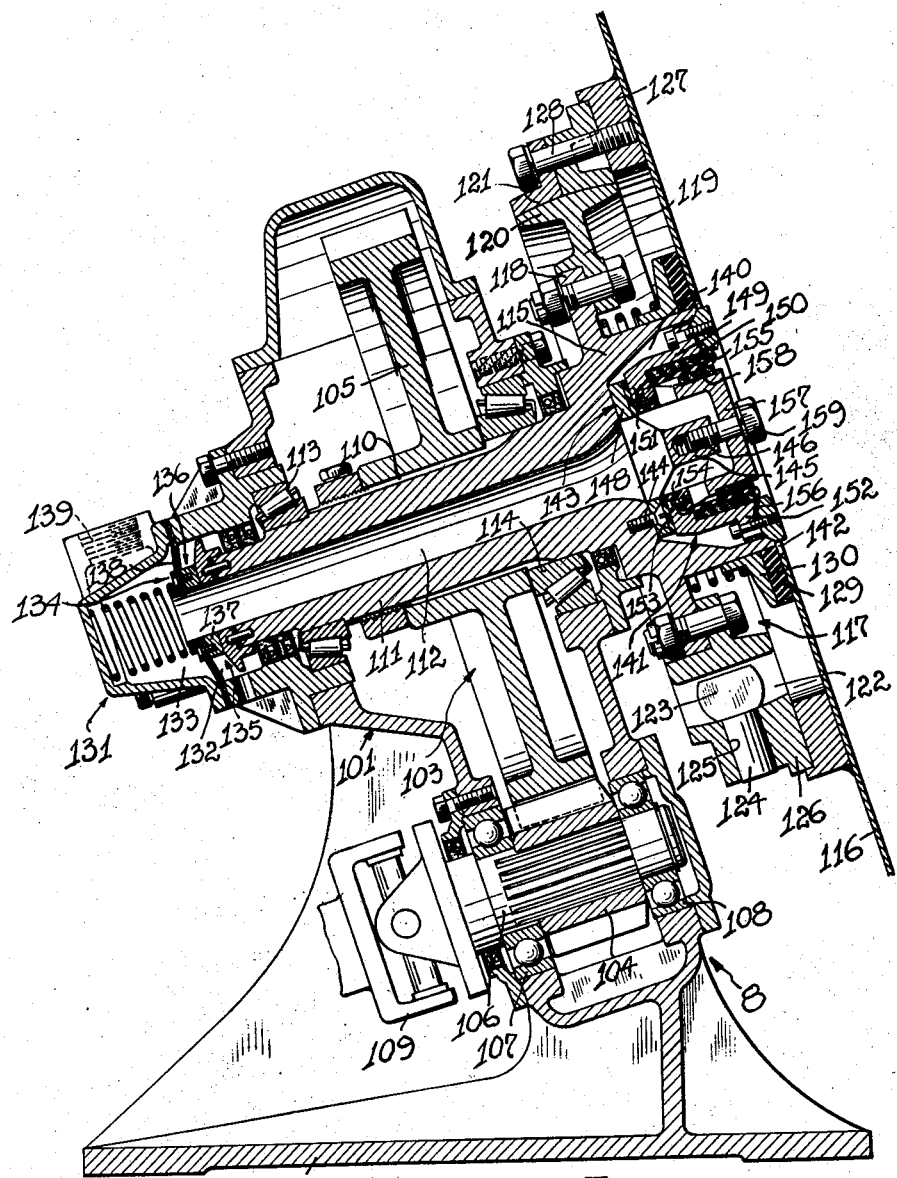
Fig. 6 is a sectional view through the secondary transmission which is universally coupled with the mixing drum and yieldingly coupled with the torque converter transmission.

Gear 41 as shown in the diagrammatic view of the gear layout (Fig. 5) additionally meshes a gear 63 mounted on an outwardly extended shaft 64 which extends into housing portion 16 and supports a clutch 65 (see Fig. 3) constructed similar to clutch 46 and, therefore, not described in detail. This clutch has its tubular toothed shaft 66 arranged in mesh with large gear 59 on countershaft 60 to permit by selective operation of either one of the two clutches 46 or 65 direct control of rotation of gear 59 in one or the other direction. Such a selective operation of clutches 46 and 65 is effected by a dual clutch lever member 67 (see Fig. 3) mounted on a rod 68 which is pivotally supported in bosses 69 and 70. Rod 68 when axially rotated in one or the other direction by a lever arm 71 effects rocking of dual clutch lever member 67 and therewith selective operation of the clutches. To that effect dual clutch lever member 67 includes oppositely extended fork-shaped levers 72 and 73 engaging the operating collar members 57 and 74 of clutches 46 and 65, respectively. Lever arm 71 additionally is coupled with a brake controlling unit 75 constructed to effect in clutch shifting operation braking of clutch structure 65 by a brake band 78 as customary, and, therefore, not specifically described.

The countershaft 60 extends into housing portion 14 and carries at its extended end a bevel pinion 79 meshing a bevel gear 80 on output shaft 15 which is rotatably mounted in ball bearings 82 and 83.

The tubular drive shaft 22, as previously stated, is extended into housing portion 11 through bore 26 in end wall 29 of housing 9 and includes an internally splined end portion 84 sleeved upon a splined tubular extension 85 on torque converter 12 to properly couple such converter with the forward and reverse drive arrangement 10. This torque converter embodies a shaft 86 rotatably mounted in the converter housing portion 11 and including at the front portion a coupling member 87 adapted to connect shaft 86 with the engine or motor 6. Converter 12 embodies a converter pump 88, a turbine 89 which has attached thereto the splined tubular extension 85, and a reaction member 91 receiving the oil from the turbine and directing such oil back into a pump 92 connected with the converter housing portion 11 by tubes 93 and 94. Converter pump 88 is directly coupled with shaft 86, the inner end portion 95 of which is in driving connection with a pump shaft 96 extended through the axial bore 21 in shaft 20.

The countershaft 34 is directly coupled with a shaft 97 which is axially aligned with shaft 34 and extended outside of main housing 9. Shaft 97 drives a power take-off pulley 98 forming part of a clutch 99 which is mounted on shaft 97 and when actuated by operating mechanism 100 effects rotation of pulley 98.

The secondary transmission 8 embodies a housing 101 having integrally extended therefrom a base plate 102 supporting said housing in angular relation with respect to said base plate. Housing 101 has arranged therein a transmission 103 including a small spur gear 104 and a large spur gear 105 engaged with and driven by gear 104. This latter gear is mounted on a splined shaft 106 mounted in ball bearings 107 and 108 and extended outwardly for coupling with the output shaft 15 of primary transmission 7 by a universal joint coupling 109. The large gear 105 is mounted on the splined portion 110 of a shaft 111 having an axial bore 112 which shaft is mounted in roller bearings 113 and 114 and extended outwardly from housing 101 for coupling the exposed end portion 115 of said shaft with the front wall 116 of mixing drum 4 by means of a universal joint coupling 117. For such purpose end portion 115 of shaft 111 is formed with a flange 118 mounting a ring-shaped coupling member 119 attached thereto. The coupling member 119 includes a peripheral flange 120 with a spherical outer surface 121 and drive slots 122 interrupting said surface and slidably guiding the flattened heads 123 of rigidly arranged drive pins 124 axially-rotatably mounted in bores 125 of a guide ring 126 which is attached to a reinforcing ring 127 in turn welded to the front wall 116 of mixing drum 4 in concentric relation with respect to its longitudinal axis. Guide ring 126 is attached to reinforcing ring 127 by bolts 128 and has its inner surface shaped spherically to permit universal movement of coupling member 119 in said guide ring.

Shaft 111 which, as stated above, is universally coupled with and supports the front portion of mixing drum 4 provides a water passage for dispensing mixing and cleaning water into said mixing drum. Thus shaft 111, the inner end of which is sealed against the front wall 116 of the mixing drum by a rubber gasket 129 forced against said wall by a spring-pressed, flanged ring member 130, includes at one end a water inlet cap 131 attached to housing 101 opposite its circular opening 132 in axial alignment with shaft 111. This cap includes a chamber 133 one wall of which is formed by a water seal arrangement embodying a rotary seal 135 and a stationary part 136 cooperating with a spring-pressed sealing ring 137 on a diaphragm 138. Chamber 133 communicates directly with bore 112 and inlet passage 139 of inlet cap 131. The other end of bore 112 is enlarged to form a chamber 140 which mounts a water discharge device 141 adapted to discharge water under pressure directly from bore 112 into mixing drum 4 provided for such purpose with an axially-arranged circular opening 142 in front wall 116.

Water discharge device 141 is mounted on a ring member 143 attached to shaft 111 by screw members 144, which ring member is bridged by a cross piece 145 having a threaded bore 146. Ring member 143 mounts on its ring portion 148 a cup shaped member 149 including a sponge rubber lining 150, which member is open at its bottom and provided with inner and outer circular flanges 151 and 152. The inner flange 151 has its one face fluid-tightly sealed to ring portion 148 by a rubber gasket 153 and has fluid-tightly secured to the other face the one end portion of a cylindrically-shaped diaphragm 155, the other end portion 156 of which is fluid-tightly attached to the outer flange 152 of cup-shaped member 149 and covers the sponge rubber lining 150 of said member.

Diaphragm 155 has adjustably extended thereinto a cup-shaped member 157 which includes a sponge rubber ring 158 engaged with the inside face of cylindrical diaphragm 155. This cup-shaped member is adjustably secured to cross piece 145 by a bolt 159 threadedly extended into the bore 146 of said cross piece.

The water discharge device 141 permits feeding of water from a tank 160 into mixing drum 4 when such water is forced under pressure into the bore 112 of shaft 111 as water under pressure actuates diaphragm 155 to compress the sponge rubber lining 150 and thus provides a ring-shaped opening through which water is sprayed into the mixing drum. Water under pressure is fed into bore 112 of shaft 111 by a centrifugal pump 161 driven by a belt drive 162 from power take-off pulley 98. This pump has an intake coupled by a valve-controlled pipe 163 with tank 160 and an outlet coupled by a pipe 164 with the inlet passage 139 of inlet cap 131.

In operation, when a drive arrangement such as described above is coupled with an engine and the mixing drum of concrete mixer, the engine rotates converter pump 88 which then forces oil into turbine 89 discharging such oil to reaction member 91 and hence back into converter pump 88 by pump 92. Reaction member 91 is mounted on a free wheel unit constructed to be locked in stationary position during periods of torque increase and to be free wheeling when torque increase is not required. This arrangement permits as maximum output torque of the converter which output is a multiple of the input torque and thereby permits starting and reversing of the drive arrangement and mixing drum by engines developing a torque sufficient to effect continuous driving of the drive arrangement and mixing drum but insufficient to start or reverse such drive arrangement and mixing drum.

Having thus described my invention, what I claim is:

1. A transmission embodying a housing, a torque converter arranged in said housing including an input shaft, a tubular output shaft and a converter pump directly coupled with and driven by said input shaft, multi-speed reversible gearing including a tubular main shaft coupled with the tubular output shaft of said torque converter, the input and output shafts of said torque converter and the tubular shaft of said gearing being axially aligned, the input shaft of the torque converter extending freely rotatably through said tubular shafts and the housing to expose the opposite ends of such input shaft outside of such housing.

2. A transmission including a housing, a torque converter in said housing at one end thereof, an input shaft coupled with said torque converter and extended outside of said housing through a wall adjacent to the end of said housing, and a tubular output shaft having said input shaft freely rotatably extended therethrough, shiftable multi-speed gearing in said housing including a main shaft aligned with the output shaft of said torque converter and coupled therewith, clutch controlled reversible gearing geared to said main shaft of said multi-speed gearing and including two parallelly arranged clutches embodying driven elements continuously geared to each other for rotation in opposite directions with respect to each other when either one of said clutches is actuated, a countershaft mounting a large gear meshing the said driven elements of the said clutches and output shaft means coupled with and driven by said countershaft.

3. A transmission including a housing, a torque converter in said housing, an input shaft coupled with said torque converter and extended outside of said housing into a wall thereof and a tubular output shaft having said input shaft freely rotatably extended therethrough, shiftable multi-speed gearing in said housing including a tubular main shaft aligned with the output shaft of said torque converter, and clutch controlled reversible gearing geared to the main shaft of said multi-speed gearing, said clutch controlled gearing including two parallelly arranged shafts, two clutch structures mounted on said shafts and gear means continuously engaged with said driven elements of the clutch structures to effect their rotation in opposite directions with respect to each other, actuating mechanism for selectively actuating either one of the clutch structures while inactivating the other one thereof, brake means for one of said clutch structures adapted to arrest rotation of said one clutch structure, and control means for the said brake means coupled with the actuating mechanism for said clutch structures to effect coordinated action of the brake means and the actuating mechanism for the clutch structures.

4. A transmission including a housing, a torque converter in said housing embodying a converter pump, an input shaft axially extended through said converter pump, said input shaft coupled with said pump and extended through said housing outside thereof, an output shaft for said torque converter, shiftable, multi-speed gearing in said housing including a main shaft aligned and coupled with the output shaft of said torque converter, clutch controlled, reversible gearing continuously coupled with the main shaft of said multi-speed gearing, and including two parallelly arranged shafts journaled in said housing and extended outside thereof and geared to each other and clutch means mounted on the outwardly extended portions of the said two shafts, a countershaft geared to said two shafts, and output shaft means journaled in said housing and geared to said countershaft.

5. A transmission including a housing, a torque converter in said housing, an input shaft extended into said housing through a wall thereof and directly coupled with said torque converter and extended therethrough, an output shaft for said converter, shiftable, multi-speed gearing in said housing including a main shaft aligned and coupled with the output shaft of said torque converter, clutch controlled reversible gearing coupled with said multi-speed gearing and including two parallelly arranged, outwardly extended shafts geared to each other for rotation in opposite directions and clutch means mounted on the outwardly extended portions of said shafts, bevel gearing continuously coupled with said clutch means, and output shaft means driven by said bevel gearing and extended outside of said housing in angular relation to the said input shaft.

6. A transmission as described in claim 5 wherein said multi-speed gearing includes a countershaft and a clutch-controlled power take-off mounted on said housing outside thereof and including a shaft axially aligned and directly coupled with said countershaft.

CHRIS GERST.

References Cited in the file of this patent

UNITED STATES PATENTS

| Number | Name | Date |
|---|---|---|
| 2,029,126 | Rybeck | Jan. 28, 1936 |
| 2,171,715 | Sinclair | Sept. 5, 1939 |
| 2,344,656 | Swennes | Mar. 21, 1944 |
| 2,413,488 | Draeger | Dec. 31, 1946 |
| 2,435,930 | Schjolin | Feb. 10, 1948 |
| 2,443,313 | Gerst | June 15, 1948 |
| 2,512,856 | Fisk | June 27, 1950 |
| 2,536,737 | Gerst | Jan. 2, 1951 |